United States Patent [19]

Siegmund

[11] 4,175,940
[45] Nov. 27, 1979

[54] METHOD FOR MAKING FIBER OPTICS FUSED ARRAYS WITH IMPROVED BLEMISH QUALITY

[75] Inventor: Walter P. Siegmund, Woodstock, Conn.

[73] Assignee: American Optical Corporation, Southbridge, Mass.

[21] Appl. No.: 916,980

[22] Filed: Jun. 19, 1978

[51] Int. Cl.$^2$ .............. C03C 23/20; C03C 15/00; C03B 11/08
[52] U.S. Cl. .............................. 65/4 A; 65/4 B; 65/4 R; 65/31; 65/38
[58] Field of Search .............. 65/DIG. 7, 31, 38, 4 B, 65/4 A, 3 A, 4 R

[56] References Cited

U.S. PATENT DOCUMENTS

| | | | |
|---|---|---|---|
| 3,140,528 | 7/1964 | Hildebrand, Jr. et al. | 65/4 B X |
| 3,331,670 | 7/1967 | Cole | 65/4 B |
| 3,350,183 | 10/1967 | Siegmund, Jr. et al. | 65/38 X |
| 3,455,667 | 7/1969 | Snitzer et al. | 65/4 B |
| 3,505,046 | 4/1970 | Phaneuf | 65/38 X |
| 3,554,720 | 1/1971 | Crepet | 65/38 X |
| 3,607,197 | 9/1971 | Ballantine | 65/4 B X |
| 4,026,693 | 5/1977 | Sato | 65/DIG. 7 |

*Primary Examiner*—S. Leon Bashore
*Assistant Examiner*—F. W. Miga
*Attorney, Agent, or Firm*—Jeremiah J. Duggan; Alan H. Spencer; Stephen A. Schneeberger

[57] ABSTRACT

Blemish quality of fused fiber optics faceplates, tapers, image inverters and other arrays of multifibers is improved by protecting outer fibers of the multifibers from excessive heating and/or contamination during their fabrication. A preform of a multiplicity of optical fibers is covered with a protective layer of removable material while being fused into a building block. The protective layer is removed from each of the building blocks and the blocks are subsequently assembled into a juxtaposition and fused into a fiber optic array. Multifibers so fabricated and used as component building blocks for the arrays uniquely minimize traditional "chicken wire" blemishing.

10 Claims, 10 Drawing Figures

4,175,940

METHOD FOR MAKING FIBER OPTICS FUSED ARRAYS WITH IMPROVED BLEMISH QUALITY

BACKGROUND OF THE INVENTION

1. Field of the Invention

This invention relates to the manufacture of fused fiber optics faceplates, tapers, image inverters and like arrays of fused multifibers with particular reference to method for improving blemish quality.

2. Discussion of the Prior Art

In the manufacture of a fused fiber optics array such as a faceplate certain aspects of the process result in blemish defects within the plate. One type of blemish is commonly referred to as "chicken wire". It is characterized by reduced transmission in those fibers at or near the boundries of the component building blocks known as multifibers or multi-multifibers. Quite often only the outer most row of fibers is affected but in severe cases the effect may extend into the next row, rarely deeper.

Since a major cause of "chicken wire" blemishing is the increased exposure to heat and contamination of the outer rows of fibers in the multi or multi-multifiber drawing process, it is a principle object of this invention to provide for protection against excessive heating or contamination of such outermost fibers of component building blocks for fiber optics arrays during the process of drawing the building blocks to desired cross sectional sizes.

Another object is to afford protection against excessive surface heating and contamination of multi or multi-multifiber components in a manner compatible with usual optical fiber processing and with minimal complication and/or additional operational expendure.

Other objects and advantages of the invention will become apparent from the following description.

SUMMARY OF THE INVENTION

The aforesaid and corollary objects are accomplished by providing a removable layer of protective material, e.g. leachable glass, around a multi or multi-multifiber preform prior to its drawing to reduced cross sectional size. In so doing, both excessive surfacing heating and contamination during drawing may be greatly reduced to preserve the light-conducting capabilities of outermost fibers of the resultant multi or multi-multifibers. Removal, of the protective layer from the fibers after drawing renders them adaptable to use as component building blocks for fiber optics arrays. The improved transmission properties at edges of the multi or multi-multifibers minimizes chicken wire blemishing in fused assemblies thereof.

It is contemplated that the aforesaid protective layers be applied to the multi or multi-multifiber preform as a row of square fibers, series of plates or strips of material, a frit or a specially formed sleeve or tube.

Details of the invention will become more readily apparent from the following description when taken in conjunction with the accompanying drawings.

IN THE DRAWINGS

Figure 9:
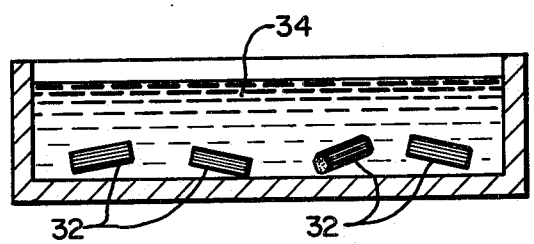
Figure 10:

FIG. 9 diagrammatically illustrates a treatment afforded multi or multi-multifiber components prior to use thereof; and FIG. 10 is a cross-section of one such component taken after practice of the treatment shown in FIG. 9.

DESCRIPTION OF THE PREFERRED EMBODIMENTS

Figure 1:
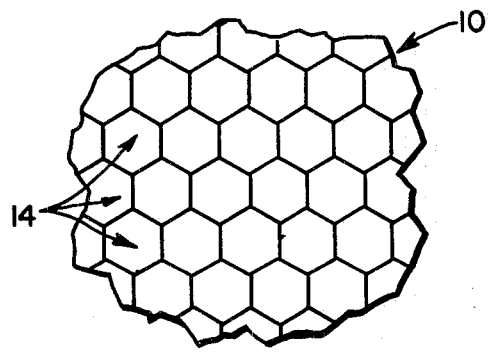
FIG. 1 is a fragmentary elevational view of a fused fiber optics array which is exemplary of a type of structure having particular pertinence to matters of the present invention.
Figure 2:
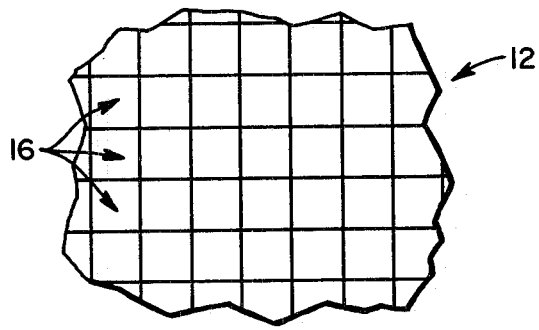
FIG. 2 is an illustration similar to FIG. 1 of another form of fused fiber optics array.

Referring more particularly to the drawings, the fiber optics arrays, (faceplates 10 and 12) of FIGS. 1 and 2 are made up of component multifiber building blocks 14 and 16 respectively.

In usual fashion, multifiber blocks 14 or 16 are juxtapositioned and fused tightly together whether hexagonal, square or of other shapes not shown, e.g. triangular, diamond, circular or simply rectangular.

Heretofore, the sides of multifiber building blocks have been exposed to excessive heating and environmental contamination during fabrication which adversely affect the light-transmitting properties of their outermost fibers.

With such blemishing extending through one or more layers of outer fibers, juxtapositioning of the blocks 14 or 16 doubles the width of the band of poorly conductive fibers and produces the well known "chicken wire" effect. These poorly light-conductive fibers between component building blocks of prior art fused fiber optics adversely affect resolution and definition of images conveyed therethrough.

The reference to "chicken wire" herein is intended to include all configurations of poorly conductive lines of fibers in fused multifiber arrays. The "chicken wire" patterning will conform to the cross-sectional geometry of multifiber building blocks used. It may be hexagonal, triangular, circular, rectangular or of other shapes.

In minimizing, if not eliminating, "chicken wire" blemishing the present invention protects outer fibers of multi and multi-multifibers against overheating and contamination during their fabrication.

For Example, multifiber preforms to be drawin into multifiber component building blocks are each provided with an outer protective layer of leachable or otherwise removable material having a softening temperature and coefficient of expansion, suitable for heating and drawing with the multifibers of the preform. An acid soluble glass or metal may be used and those interested in details of selecting and using such materials may refer to one or more of U.S. Pats. Nos. 3,004,368; 3,624,816 and 3,669,772.

Figure 3:
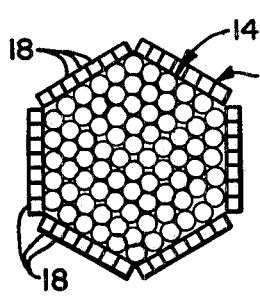
FIGS. 3, 4, 5 and 6 are cross-sectional views of preforms of multifibers from which improved component building blocks of fused fiber optics arrays may be produced according to the invention.
Figure 4:
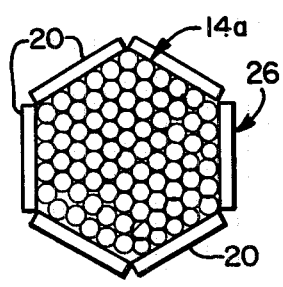
Figure 5:
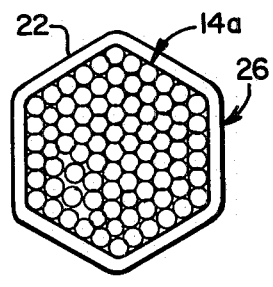
Figure 6:
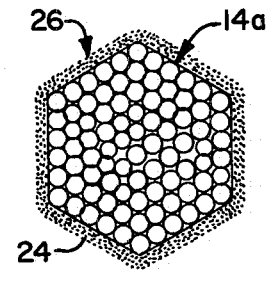

As illustrated in FIG. 3, multifiber preform 14 is layered with a number of juxtaposition relatively small square fibers 18 of leachable material, e.g. a high borax content glass. As an alternative to the use of fibers 18, the fabrication of layer 26 may comprise plates or strips 20 (FIG. 4) of leachable material, a surrounding sleeve or tube 22 (FIG. 5) or a coating of glass frit 24 (FIG. 6). It is to be understood, however, that the aforesaid protective layer of fibers 18, strips 20, tube 22 or frit 24 may be similarly applied to cross-sectionally square, circular, triangular, rectangular or differently shaped multifiber preforms. The fabrication of multi and/or multi-multifiber structures will not be dealt with herein but those interested in such details may refer to one or more of U.S. Pats. Nos. 2,992,516; 3,837,727; 3,196,738; 3,193,363.

Figure 7:
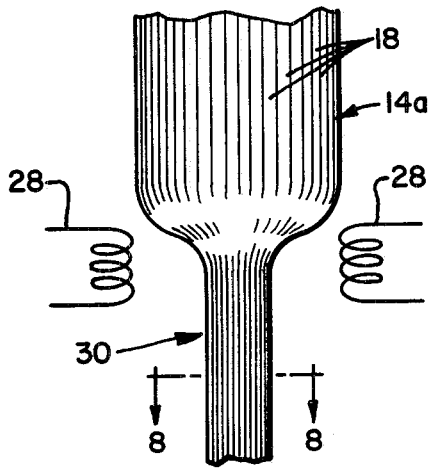
FIG. 7 is a diagrammatic illustration of an operation of drawing a multi or multi-multifiber preform.

According to the present invention the selected multifiber preform with protective layer 26, e.g. preform 14a of FIGS. 3 or 4-6, is heated zonally with heating coils 28 or other such means commonly used in the art and is progressively drawn to the reduced cross-sectional size (FIG. 7) desired of building blocks 14.

Figure 8:
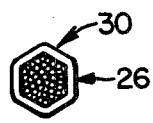
FIG. 8 is a cross-section taken approximately along line 8—8 of FIG. 7.

The drawn multifiber component 30 (FIG. 8) is removed from preform 14a and sections 32 of its length are immersed in a leaching medium 34 (FIG. 9) to remove layer 26 which served to protect their outermost fibers against excessive heating and/or contamination during the drawing operation. Sections 32 may be of lengths corresponding to the thickness desired of faceplate 10, for example, or longer and subsequently finished to desired size.

Following removal of protective layer 26 from section 32, they are thoroughly cleansed of residues from leaching by whatever means may be appropriate including the use of ultrasonics. Suitable cleaning procedures are disclosed in the aforementioned U.S. Pats. Nos. 3,004,368 and 3,624,816.

If cut to lengths corresponding to the thickness of faceplate 10 for example, the leached and cleaned sections 32 (FIG. 10) may be directly utilized as building blocks 14 for faceplate 10. If longer, sections 32 may be cut or ground to finished size.

Those interested in details of methods of fabricating faceplates and similar fiber optics arrays of multi or multi-multifiber building blocks may refer to U.S. Pats. Nos. 3,395,006; 3,626,040; 3,625,669; 4,002,452.

From the foregoing, it can be seen that "chicken wire" blemishing of fused fiber optics faceplates and like arrays which heretofore caused reduced light-transmission of fibers adjacent boundries of the multi and multi-multifiber components may be minimized, if not eliminated. Those skilled in the art, however, will readily appreciate that there may be various other forms and adaptations of the invention which may be made to suit particular requirements and the foregoing illustrations need not be interpreted as restrictive of the invention beyond that necessitated by the following claims.

I claim:
1. The method of making a fused fiber optics array with improved blemish quality comprising:
   tightly juxtapositioning a multiplicity of optical fibers into the overall cross-sectional configuration desired of component building blocks of said array, said juxtapositioned fibers constituting a preform of said building blocks;
   covering the sides of said preform with a layer of removable material having a melting temperature and coefficient of expansion compatible with said preform;
   heating and drawing said covered preform into a section having a reduced cross-sectional size which corresponds to that desired of said building blocks;
   separating a length of said drawn section from said preform;
   removing said layer of covering material from said separated length of said drawn section;
   dividing said length of said drawn section into a plurality of relatively short building blocks each of a length approximately corresponding to the thickness desired of said fused array;
   tightly juxtapositioning said number of said shorter sections;
   said step of dividing of said length of said drawn section being performed at a preselected stage between said step of drawing said preform and said step of juxtapositioning said shorter building block sections; and
   fusing said tightly juxtapositioned shorter sections together to produce said array.

2. The method according to claim 1 wherein said step of dividing said length of said drawn section is performed prior to performance of said step of removing said layer of covering material.

3. The method according to claim 1 wherein said step of dividing said length of said drawn section is performed subsequent to performance of said step of removing said layer of covering material.

4. The method according to claim 1 wherein said layer of covering material is leachable and said step of removing same is performed by a leaching operation.

5. The method according to claim 1 wherein said layer of removable material on said preform initially comprises a multiplicity of fibers.

6. The method according to claim 1 wherein said layer of removable material on said preform initially comprises a succession of plates.

7. The method according to claim 1 wherein said layer of removable material on said preform is initially in the form of a sleeve.

8. The method according to claim 1 wherein said layer of removable material on said preform initially comprises a glass frit.

9. The method according to claim 1 wherein said optical fibers are formed of glass and said layer of removable material is glass.

10. The method according to claim 9 wherein said layer of removable material is a high borax containing glass.

* * * * *